(12) United States Patent
Adjedj

(10) Patent No.: US 8,595,513 B2
(45) Date of Patent: Nov. 26, 2013

(54) METHOD AND SYSTEM FOR PROTECTING A CRYPTOGRAPHY DEVICE

(75) Inventor: Michael Adjedj, Bonneuil-sur-Marne (FR)

(73) Assignee: Logiways France, Paris (FR)

( * ) Notice: Subject to any disclaimer, the term of this patent is extended or adjusted under 35 U.S.C. 154(b) by 77 days.

(21) Appl. No.: 13/306,695

(22) Filed: Nov. 29, 2011

(65) Prior Publication Data

US 2012/0163584 A1    Jun. 28, 2012

(30) Foreign Application Priority Data

Nov. 30, 2010 (FR) ...................... 10 59936

(51) Int. Cl.
*H04L 29/14* (2006.01)
*H04L 9/12* (2006.01)

(52) U.S. Cl.
USPC .............................. 713/193; 713/190; 726/34

(58) Field of Classification Search
USPC ......................................................... 380/28
See application file for complete search history.

(56) References Cited

U.S. PATENT DOCUMENTS

2009/0180611 A1    7/2009    Douguet et al.

OTHER PUBLICATIONS

Symmetric-Key Homomorphic Encryption for Encrypted Data Processing. Chan. Sep. 2009. IEEE.*
The Use of Encrypted Functions for Mobile Agent Security. Lee. Jan. 2004.IEEE.*
Smart, N. P. "An Analysis of Goubin's Refined Power Analysis Attack," CHES 2003, LNCS vol. 2779, Springer, Sep. 23, 2003; pp. 281-290.
Chow, S. et al. "A white-box DES implementation for DRM applications," ACM DRM 2002, Springer, LNCS, Jan. 1, 2003; pp. 1-15.
Preliminary Search Report and Written Opinion for French Patent Application No. FR1059936 mailed Aug. 18, 2011.

* cited by examiner

*Primary Examiner* — Venkat Perungavoor
(74) *Attorney, Agent, or Firm* — McDermott Will & Emery LLP

(57) ABSTRACT

The method for protecting a cryptography circuit from attacks aiming to discover a secret datum ($D_i$, K) used during execution by the circuit of a cryptography algorithm comprising the application (22) of at least one cryptographic operation ($O_i$) to the data ($D_i$), said data belonging to a first mathematical structure (E) having at least one group structure and provided with at least one binary operation, is characterized in that it comprises a step ($OP_i$) for protecting said cryptographic operation, comprising applying (20) to said data ($D_i$) at least one first reversible homomorphism ($M_i$), compatible with said binary operation, before applying (22) said cryptographic operation ($O_i$), and applying (24) at least one second homomorphism ($M_i^{-1}$), opposite the first homomorphism ($M_i$), after applying said cryptographic operation ($O_i$).

10 Claims, 3 Drawing Sheets

Figure 3:
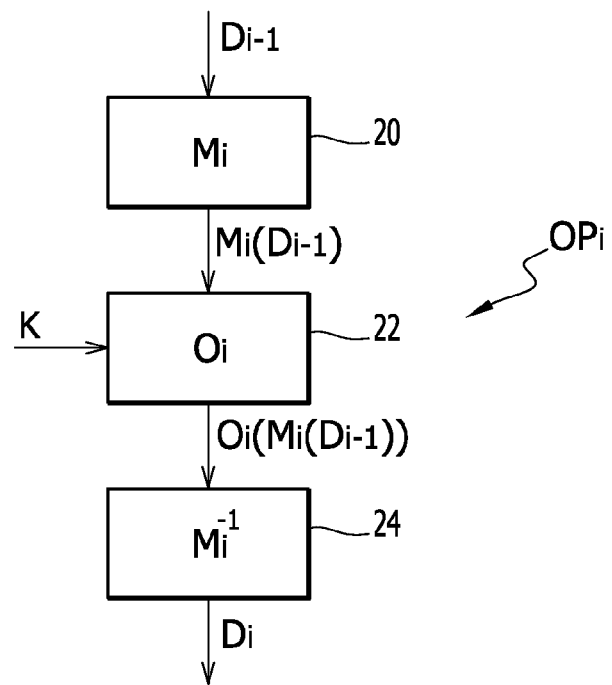

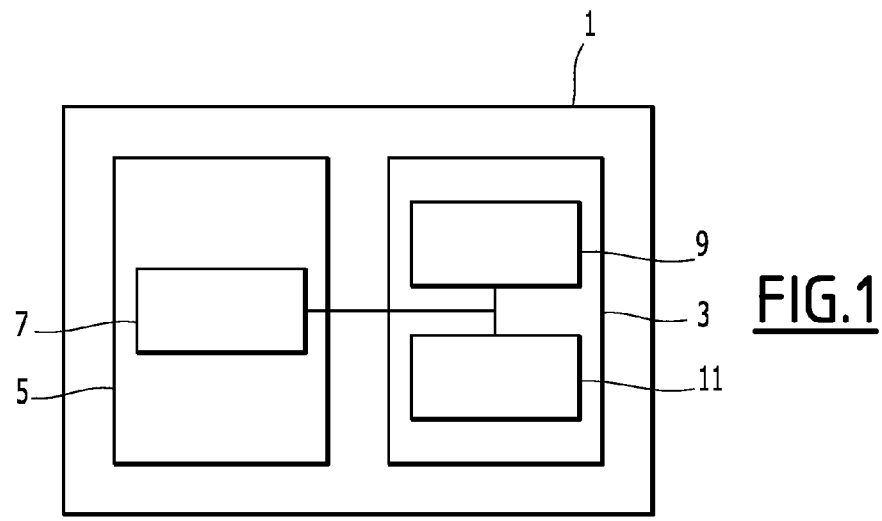
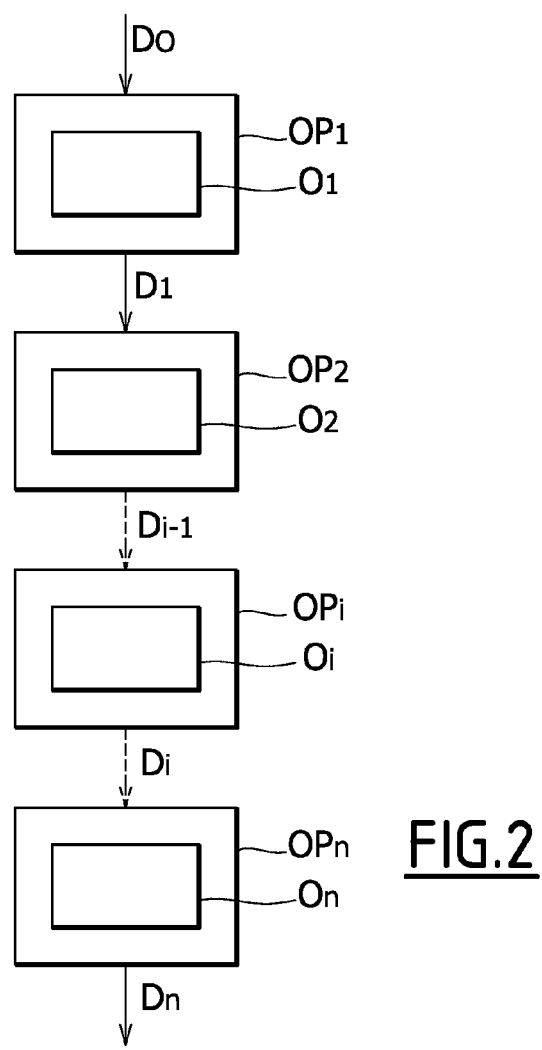

§ 119 to French Patent Application No. 1059936, filed on Nov. 30, 2010, which is incorporated herein by reference.

The present invention relates to a method for protecting a cryptography circuit from attacks aiming to discover a secret datum used during execution by the circuit of a cryptography algorithm comprising the application of at least one cryptographic operation to the data, said data belonging to a first mathematical structure having at least one group structure and provided with at least one binary operation.

The purpose of cryptography is to allow to entities to communicate in complete security using an unsafe communication channel, i.e. a channel that may be spied on by a third entity, hereafter called "adversary,"

To that end, cryptography in particular makes it possible to protect the confidentiality of a piece of information, through encryption of that information and the dual operation, decryption, or to protect only the authenticity of a piece of information, using complementary signature and signature verification operations.

Cryptographic protection of a given message is generally implemented by a microcircuit, by applying one or more mathematical operations to that message, operations which depend on a key, called secret key in symmetrical cryptography and public or private in asymmetrical cryptography.

Such a protection method is, however, subject to attack by an adversary, seeking to access the content of the message or the key itself.

A standard adversary model, at the root of the use of cryptography to protect communications, is that where the adversary is only an observer, passive and/or active, acting via the transmission channel. In this model, the adversary can access all communications, interrupt them or even alter them. Cryptographic protocols resistant to these categories of adversaries exist, and in some cases perform very well.

Due in particular to the widening of the fields of application of cryptography, new adversary and attack models have appeared. In particular, microcircuit devices implementing cryptography algorithms are sometimes subject to attacks aiming to determine the secret data they manipulate such as the key(s) used and possibly, in certain cases, information on the messages themselves.

This is for example the case of so-called side channel attacks, which exploit certain properties of software or material implementations of the cryptography algorithms.

In particular, certain types of attacks exploit the fact that each mathematical operation of a cryptographic computation has a different energy signature from another one. For example, the energy consumption generated by the transition of an information bit from value '1' to value '0' is different from that generated by the transition of a bit from '0' to '1'

Thus, SPA (Simple Power Analysis) or DPA (Differential Power Analysis) attacks consist of measuring the power consumption generated by a cryptographic calculation, for example the currents and voltages entering and leaving the microcircuit during execution of the cryptographic algorithm, and deducing the series of operations performed, or even the key used, from those currents or voltages.

Furthermore, measuring the electromagnetic field created by the electric current during a cryptographic computation may lead to electromagnetic attacks (EMA), the principle of which is identical to attacks relating to the energy consumption.

Furthermore, "time attacks" make it possible to find the key(s) used during a cryptographic computation from simple measurements of execution times, i.e. by analyzing the duration of the mathematical computation units, which can depend on the values of the data.

These new types of attacks, based on simple passive observation of the cryptographic computations, can be implemented to fraudulently access paid television services, for example. Such services use encryption and decryption algorithms to safely transmit audiovisual content to subscribers, who have decoders able to decrypt the encrypted content using a key. The power consumption of these decoders can thus be monitored and analyzed to access that key, and thereby give the attacker the ability to decrypt the audiovisual content fraudulently.

Furthermore, another type of element, having access to the cryptography circuit, can also be considered. This type of adversary would in particular have access to the register at all times, and be able to monitor access to the different variables at any time, and observe the operations carried out. This is then called "white-box" cryptography.

The aim of the invention is therefore to provide a cryptographic protection method offering increased resistance to attacks of the aforementioned type.

To that end, the invention relates to a protection method of the aforementioned type, characterized in that it comprises a step for protecting said cryptographic operation, comprising:
  applying to said data at least one first reversible homomorphism, compatible with said binary operation, before applying said cryptographic operation, and
  applying at least one second homomorphism, opposite the first homomorphism, after applying said cryptographic operation.

The method according to the invention also comprises the following features, considered separately or in combination:
  said cryptographic operation is applied to the result of said first homomorphism,
  said second homomorphism is applied to the result of said cryptographic operation,
  said second homomorphism is applied after applying at least two cryptographic operations to the result of said first homomorphism,
  said cryptography algorithm comprises applying at least two cryptographic operations to the data, and at least one reversible homomorphism is applied before at least two of said cryptographic operations,
  at least two distinct homomorphisms are applied to said data,
  said homomorphism is an application of said first mathematical structure toward a second mathematical structure distinct from said first structure, provided with at least one binary operation different from said at least one binary operation of said first structure,
  said homomorphism is a homomorphic encryption,
  said cryptographic operation is applied using a correlation map indicating the result of said operation as a function of the input variable of that operation,
  said homomorphism and said cryptographic operation are applied using a single correlation map indicating the result of the composition of at least said homomorphism and said operation as a function of the input variable of said homomorphism.

The invention also relates to a device for protecting a cryptography circuit against attacks aiming to discover a secret datum used during the execution by said circuit of a cryptography algorithm comprising the application of at least one cryptographic operation to data, said data belonging to a first mathematical structure having at least one group structure and provided with at least one binary operation, characterized in that it comprises means for applying to said data at least a first reversible hornornorphisrn, compatible with said binary operation, before applying said cryptographic operation, and at least one second homornorphisrn, opposite said first homomorphism, after applying said cryptography operation.

Figure 4:
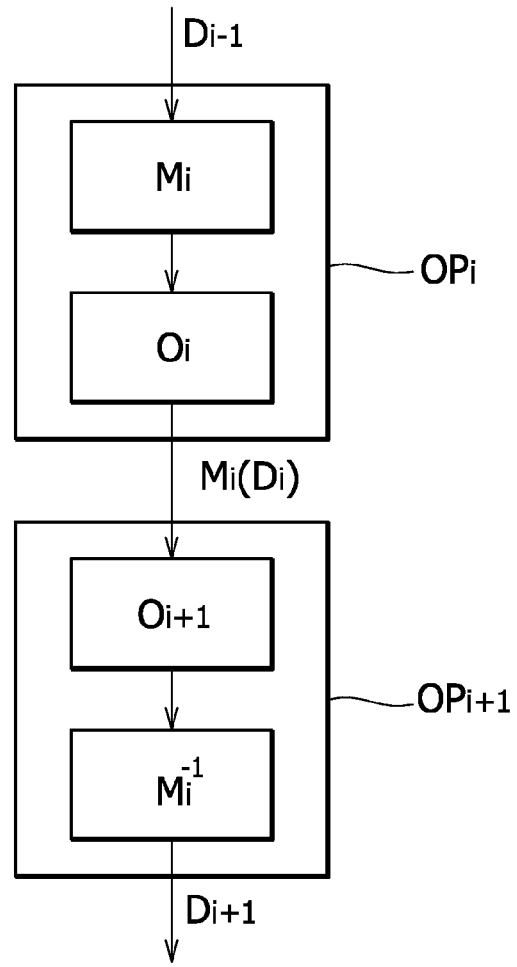
Figure 5:
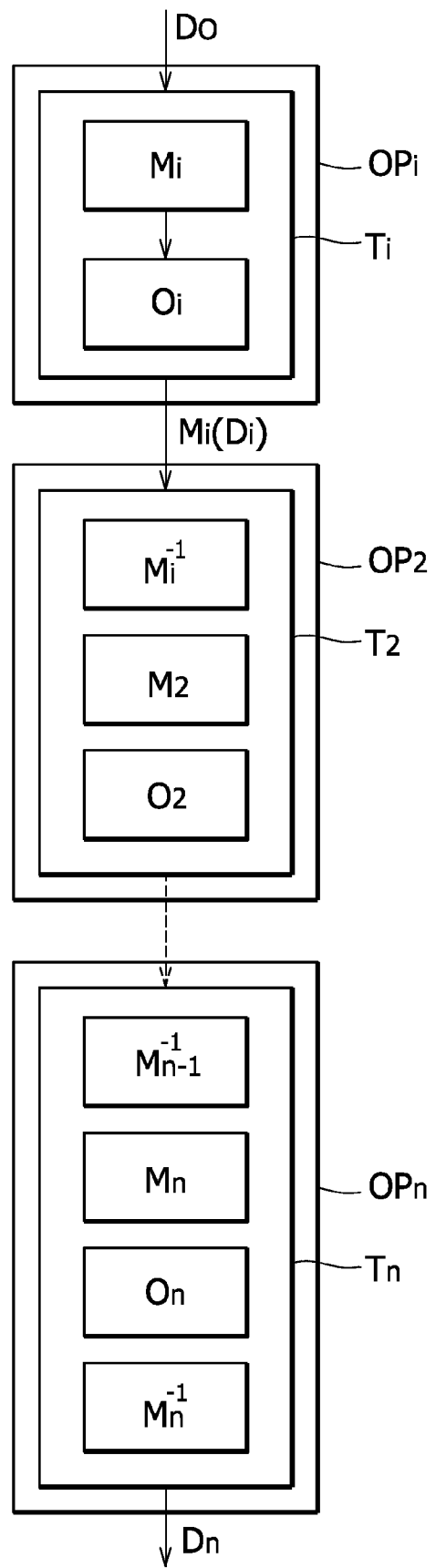

The invention will be better understood using the following description, provided only as an example, and done in reference to the appended drawings, in which:

FIG. 1 diagrammatically illustrates the structure of a protection device according to one embodiment of the invention, FIG. 2 is a summary diagram illustrating the successive steps of the protection method according to one embodiment of the invention, FIG. 3 is a detailed illustration of a step of the protection method shown in FIG. 2, FIG. 4 is a summary diagram illustrating the successive steps of the protection method according to another embodiment of the invention, and FIG. 5 is a summary diagram illustrating the successive steps of the protection method according to another embodiment of the invention, FIG. 1 shows a protection device 1 according to a first embodiment of the invention.

The device 1 comprises a processor 3 and a memory 5, connected so as to be able to exchange data such as a security key or data.

The memory 5 can store data, and comprises a secured memory space 7, able to securely store in particular the security key(s) and/or the data to be encrypted or decrypted, at least temporarily.

The processor 3 comprises an algorithmic cryptography application 9, which can apply a cryptography algorithm such as encryption or decryption to data to be protected or that is protected, and means 11 for protecting the algorithmic application.

The microprocessor 3 is thus able to apply a cryptography algorithm to a message and implement a method for protecting that algorithm so as to prevent detection of the key and/or data by an adversary.

FIG. 2 shows the primary steps of the protection method according to one embodiment of the invention, implemented by the protection device 1 as shown in FIG. 1 during execution of a cryptography algorithm on the data requiring cryptographic protection, involving a security key.

We will hereafter consider that this cryptography algorithm is an encryption, but the protection method described in reference to FIGS. 2 to 5 could indifferently be applied to decryption operations or any other type of cryptographic protection algorithm.

The execution of this cryptography algorithm comprises implementing a plurality of mathematical operations $O_i$, also called cryptographic operations, successively applied to the initial data, then to the data obtained after each of these operations. In the rest of the description, $D_0$ will denote the initial data, $D_i$ the data obtained after an operation $O_i$, and $D_n$, the data obtained at the end of the cryptography algorithm.

The operations $O_i$, that depend on the security key, denoted K, are for example chosen from among basic operations such as addition, subtraction, multiplication and division, any operation derived from these basic operations, such as exponentiation or polynomial evaluation, or binary operations such as the "exclusive or" XOR or the "and" function AND.

Each of these operations $O_i$ is protected from possible attacks by the inventive method, The encryption of the data $D_0$ thus more generally comprises implementing a plurality of protected mathematical operations $OP_i$, the results of which are identical to the results of the operations $O_i$, but which are protected from attacks such as D channel attacks.

The steps carried out during each protected operation $OP_i$, are detailed in FIG. 3.

The protection of each mathematical operation, and more generally of the entire cryptography algorithm, rests on the application to the data, advantageously before each operation, of a first group morphism, or homomorphism, reversible and randomly selected, and the application, advantageously after each operation, of a reverse homomorphism the first homomorphism.

Thus, the implementation of a protected operation $OP_i$ comprises a step 20 for applying a first homomorphism, denoted $M_i$, to the initial data $D_0$ or to the data $D_{i-1}$ resulting from the protected operation $OP_{i-1}$. Then, during step 22, the operation $O_i$ which depends on the key K, is applied to the result $M_i(D_{i-1})$ obtained at the end of step 20. Lastly, during step 24, a second homomorphism, denoted $M_i^{-1}$, opposite the first morphism $M_i$, is applied to the result of the operation $O_i$.

A group is an algebraic structure defined as a set E of elements, provided with at least one binary operation, generally denoted additively ($+_E$) or multiplicatively ($\times_E$). All of the elements of the group have an inverse for the binary law. Furthermore, the net comprises a neutral element denoted $O_E$ when the law is denoted additively, or $1_E$ when the law is denoted multiplicatively.

A set is a ring if it has two binary laws, generally denoted $+_E$ and $\times_E$ respectively, such that (E, $+_E$) is a group.

Furthermore, if all of the elements, with the exception of the zero element, are reversible by the multiplicative law, the ring E is a field, A group morphism between two groups E and F. possibly equal, is defined as an application $\phi$ compatible with the law of those groups, i.e. such that for any $x,y \in E$, $\phi(x+_E y) = \phi(x) +_F \phi(y)$ and $\phi(0_E) = 0_F$, where $+_E$ and $+_F$ designate the binary law of groups E and F, respectively, and $O_E$ and $O_F$ their neutral element, Furthermore, if a morphism $\phi$ is bijective, it is reversible. Thus, denoting its inverse with $\phi^{-1}$, for any element x of the set E: $\phi^{-1}(\phi(x)) = \phi(\phi^{-1}(x)) = x$.

Furthermore, a group morphism is a ring morphism if it involves an application $\phi$ defined between two rings E and F, and compatible with the laws of those rings, i.e. such that:

$$\text{for any } x,y \in E, \phi(x+_E y) = \phi(x) +_F \phi(y) \tag{1}$$

$$\text{for any } x,y \in E, \phi(x \times_E y) = \phi(x) \times_F \phi(y) \tag{2}$$

$$\phi(0_E) = 0_F \text{ and } \phi(1_E) = 1_F$$

A ring morphism therefore keeps all of the usual operations, such as addition and multiplication, but also the operations derived from them such as exponentiation or composition by a polynomial, or their reverse operations (subtraction or inversion of the reversible elements).

In the rest of the description and claims, the general term "homomorphism" will designate any application of a set E toward a set F. possibly identical, having at least one group structure, this application preserving at least one binary law of those sets.

Of course, this name also includes any morphism having, aside from the properties of a group morphism, additional properties, and in particular ring morphisms, algebra morphisms or field morphisms. For example, an algebra morphism keeps, aside from the two binary operations, a so-called external law, for example multiplication by an element of a different body from the algebra in question.

Thus, if one considers that the data D are elements of a ring E provided with an addition and a multiplication, and that the morphism $M_i$ applied to the data $D_i$ during step 20 is a reversible morphism as previously defined, for example an endomorphism, and the reverse of which is the morphism $M_i^{-1}$ applied during step 24, the data $D_{i+1}$ obtained at the end of step 24 verify the following equality:

$$D_i = M_i^{-1}(O_i(M_i(D_{i-1}))) = O_i(D_{i-1})$$

In fact, since the operation $O_i$ is a basic operation of the ring E, or an operation derived from the basic operations of the ring E, this operation $O_i$ is preserved by the morphisms $M_i$ and $M_i^{-1}$. In particular, since the morphism $M_i$ preserves the additive law and the multiplicative law of the ring E, all of the operations derived from those two laws, therefore all of the operations $O_i$, are also preserved.

Consequently, the data $D_i$ obtained at the end of step 24 are identical to the data that would have been obtained solely by applying the operation $O_i$ to the data $D_{i-1}$.

However, due to the random nature of the applied ring morphism, the bits of the input variables are randomly altered. The energy signature (electrical and/or thermal and/or electromagnetic) of the protected operation $OP_i$ as well as its execution duration are therefore random, unlike those of the operation $O_i$, which makes any analysis of the energy consumption or emissions, or the execution time, ineffective.

Applying a morphism to the data $D_{i-1}$ before each mathematical operation $O_i$ and the reverse morphism after that operation thereby makes it possible to conceal the energy signature of the operations $O_i$ successively applied to the data to be encrypted, therefore to protect the encryption of that data from attacks such as side channel attacks, without altering the final result $D_n$ of the cryptography algorithm, i.e., the encrypted data.

Advantageously, the morphism $M_i$ and its opposite $M_i^{-1}$ used during the various protected operations $OP_i$ are different from one another, and are chosen randomly. Thus, the energy signature of the morphisms $M_i$ cannot be analyzed. Furthermore, the morphisms $M_i$ used are advantageously modified upon each execution of the cryptography algorithm, such that the energy signature of that algorithm is different upon each execution, preventing any statistical analysis of that signature.

Each morphism $M_i$ is then randomly chosen before executing the operation $O_i$, for example by random drawing of that morphism in a pre-established database of morphisms, or by determining new morphisms during execution of the algorithm.

The morphisms $M_i$ are for example Frobenius morphisms, defined on he ring E of characteristic p>0 by:

$$\text{Frob}_E: x \to x^p,$$

or any morphism defined from the Frobenius morphism.

The ring E is then for example an extension of a Galois field of degree $k \geq 2$, denoted $GF(p^k)$. A Galois field, denoted $GF(p)$, is defined by all of the modulo p integers, in particular denoted Z/pZ, p being a prime number. In such a field, $x^p = x$, Alternatively, the ring morphisms $M_i$ can be homomorphic encryptions, i.e. encryption operations having the same properties as a morphism, and depending on a key Ks.

These homomorphic encryptions are advantageously completely homomorphic encryptions, as defined in "Fully Homomorphic Encryption Using Ideal Lattices," Gentry C., STOC 2009, 169-178. Such morphisms have algebraic properties substantially identical to the field morphisms, and thus able to be considered ring morphisms. In particular, such morphisms completely preserve the structure of the starting set, ring or field, and in particular the additive law XOR and the multiplicative law AND, and are reversible.

Such morphisms can thus be used when the operations Oi executed during the cryptography algorithm are binary operations, for example XOR operations, AND operations, or operations derived from them.

Furthermore, homomorphic encryptions preserving L types of operations (for example addition and/or multiplication) may also be used.

Homomorphic encryption also has the advantage of depending on a key Ks, hereafter called secondary key because the encrypted data obtained at the end of the cryptography algorithm do not depend on that key. Homomorphic encryption can therefore be written as a function $C(D_i, K_s)$, or, with a fixed key, as a function $f(D_i)$ having the homomorphic properties previously described.

Consequently, a same homomorphic encryption function C can create a very large number of different reversible morphisms $f$ (of order $10^{300}$), by modifying only the key Ks. In practice, a number of different keys of order $10^{40}$ may prove sufficient.

Thus, the morphisms $M_i$ (and their opposites) used to protect the successive operations of a cryptography algorithm can be chosen randomly by selecting a same encryption C for all of the protected operations $OP_i$, but while randomly choosing the key Ks for that encryption before each of those operations.

Alternatively, the morphisms $M_1$ can be simply homomorphic encryptions, not preserving the additive law and the multiplicative law, but only one of those laws. This may for example involve RSA (Rivest Shamir Adleman) encryption, which preserves only the multiplication. Such morphisms $M_i$ can also be used when the operations $O_i$ only use a single type of basic operation, for example only addition or only multiplication.

It should, however, be understood that the embodiment presented above is not limiting.

In particular, according to another embodiment, illustrated in FIG. 4, the reverse morphism $M_i^{-1}$ is not applied immediately after the operation $O_i$, but after several consecutive operations $O_i, O_{i+1}$ ... Thus, in the embodiment illustrated in FIG. 4, one of the protected operations $OP_i$ comprises the application of a homomorphism $M_i$ to the data $D_{i-1}$, followed by the application of the operation $O_i$. That protected operation $OP_i$ is itself directly followed by the application of the operation $O_{i+1}$, then the reverse morphism $M_i^{-1}$. The operation $O_{i+1}$ is thus applied to the image of the data $D_i$ by the morphism $M_i$.

Furthermore, several morphisms can be applied to the data before each operation $O_i$, the reverse morphisms then being applied successively after each operation Oi, so as to offer better resistance to attacks.

Furthermore, the morphisms used are not necessarily endomorphisms, and can be applications of a first ring E toward a second ring F whereof the additive and multiplicative laws are advantageously different from the additive and multiplicative laws of the first ring E. Such morphisms have the advantage of transposing the operations $O_i$ in an algebraic space F different from the algebraic space E of the data $D_i$, which further increases the protection of the cryptography algorithm. In fact, in this embodiment, an attacker cannot access the mathematical set in which the operations are performed, even using in-depth statistics on the energy signals of the computations.

According to one particular embodiment, the operations $O_i$ and/or the morphisms and $M_i^{-1}$ are not done via computations, but via correlation maps, making it possible to access the result of an operation without computation from values of the input variables (the data $D_i$ for example). FIG. 5 thus illustrates two successive protected operations done during the execution of a cryptography algorithm according to this embodiment.

During a first protected operation $OP_1$, the processor 3 applies to the data $D_0$ the morphism $M_1$ and operation $O_1$, without computation, but by accessing a correlation map $T_1$ corresponding to the operation $O_1 \circ M_1$, stored in the protected memory 7. Thus, during this operation $OP_1$, the processor 3 looks for the image $O_1 \circ M_1(D_0)$ of the input data $D_1$ by combining the morphism $M_1$ and the operation $O_1$.

Then, during the following protected step $OP_2$, the processor applies to the data $M_1(D_1)$ resulting from step $OP_1$ the reverse morphism $M_1^{-1}$, followed by the morphism $M_2$, and operation $O_2$, using a single correlation map $T_2$ corresponding to the operation $O_2 \circ_{M2} \circ M_1^{-1}$, stored in the protected memory 7.

The following steps $OP_i$ are carried out according to the same principle. However, the reverse morphism $M_n^{-1}$ is applied to the data during the last step $OP_n$, so as to obtain, at the end of the n steps $OP_1, OP_2, \ldots OP_n$, the same encrypted data as those that would have been obtained by applying only operations $O_1, \ldots O_n$.

Advantageously, the morphisms $M_i$ and $M_i^{-1}$ are applications of a first ring E toward a second ring F different from E, and transposing the operation $O_i$ into a different algebraic space from the algebraic space E of the data $D_{i-1}$. Such a transposition results in preventing a possible attacker from determining a linear relationship between the input data and the output data of the operations OPi, and to deduce therefrom the operations $O_i$ performed.

The use of such correlation maps is thus particularly advantageous to protect the cryptography algorithms when the attackers have the possibility of monitoring the computations done step by step, the protection method according to the invention therefore making it possible to improve the security of cryptography systems in a white box.

It will be noted that when the cryptography algorithm comprises several mathematical operations $O_i$, the latter are not necessarily all protected by applying a reversible morphism.

The invention claimed is:

1. A method for protecting a cryptography circuit from attacks aiming to discover a secret datum used during execution by the circuit of a cryptography algorithm, comprising the application of at least one cryptographic operation to the data, said data belonging to a first mathematical structure having at least one group structure and provided with at least one binary operation, comprising a step for protecting said cryptographic operation, comprising:
    applying to said data at least one first reversible homomorphism compatible with said binary operation, before applying said cryptographic operation, and
    applying at least one second homomorphism, opposite the first homomorphism, after applying said cryptographic operation,
    wherein said homomorphism is an application of said first mathematical structure toward a second mathematical structure distinct from said first structure, provided with at least one binary operation different from said at least one binary operation of said first structure.

2. The protection method according to claim 1, wherein said cryptographic operation is applied to the result of said first homomorphism.

3. The protection method according to claim 1, wherein said second homomorphism is applied to the result of said cryptographic operation.

4. The protection method according to claim 1, wherein said second homomorphism is applied after applying at least two cryptographic operations to the result of said first homomorphism.

5. The protection method according to claim 1, wherein said cryptography algorithm comprises applying at least two cryptographic operations to the data, characterized in that at least one reversible homomorphism is applied before at least two of said cryptographic operations.

6. The protection method according to claim 5, wherein at least two distinct homomorphisms are applied to said data.

7. The protection method according to claim 1, wherein said homomorphism is a homomorphic encryption.

8. A method for protecting a cryptography circuit from attacks aiming to discover a secret datum used during execution by the circuit of a cryptography algorithm, comprising the application of at least one cryptographic operation to the data, said data belonging to a first mathematical structure having at least one group structure and provided with at least one binary operation, comprising a step for protecting said cryptographic operation, comprising:
    applying to said data at least one first reversible homomorphism, compatible with said binary operation, before applying said cryptographic operation, and
    applying at least one second homomorphism, opposite the first homomorphism, after applying said cryptographic operation, wherein said cryptographic operation is applied using a correlation map indicating the result of said operation as a function of the input variable of that operation.

9. The protection method according to claim 8, wherein said homomorphism and said cryptographic operation are applied using a single correlation map indicating the result of the composition of at least said homomorphism and said operation as a function of the input variable of said homomorphism.

10. A device for protecting a cryptography circuit against attacks aiming to discover a secret datum used during the execution by said circuit of a cryptography algorithm comprising the application of at least one cryptographic operation to data, said data belonging to a first mathematical structure having at least one group structure and provided with at least one binary operation, said device being configured for applying to said data at least a first reversible homomorphism compatible with said binary operation before applying said cryptographic operation, and at least one second homomorphism, opposite said first homomorphism, after applying said cryptography operation, wherein said homomorphism is an application of said first mathematical structure towards a second mathematical structure distinct from said first structure, provided with at least one binary operation different from said at least one binart operation of said first structure.

* * * * *